United States Patent
Hetznecker

[11] 3,762,951
[45] Oct. 2, 1973

[54] METHOD AND APPARATUS FOR REMOVING ACCUMULATED PAINT FROM PAINT RACKS

[75] Inventor: Frank W. Hetznecker, Wabash, Ind.
[73] Assignee: Honeywell Inc., Minneapolis, Minn.
[22] Filed: Sept. 8, 1971
[21] Appl. No.: 178,721

[52] U.S. Cl................ 134/16, 118/500, 134/38, 211/123
[51] Int. Cl.............................. B08b 7/02
[58] Field of Search................ 134/16, 17, 38; 211/105.1, 123; 118/500, 501, 502, 503; 92/89, 90; 249/65; 244/134 A

[56] References Cited
UNITED STATES PATENTS
1,998,809   4/1935   Geer ............................ 244/134 A
1,840,834   1/1932   Davis ............................ 134/17 UX
2,274,066   2/1942   Jacocks ........................ 134/17 UX FOREIGN PATENTS OR APPLICATIONS
615,602   1/1927   France ................................ 249/65

Primary Examiner—Morris O. Wolk
Assistant Examiner—D. G. Millman
Attorney—Lamont B. Koontz

[57] ABSTRACT

A method and apparatus for removing accumulated paint from paint racks used to support articles to be spray painted. Frame members of the paint rack are enclosed in a substantially skin-tight relation by one or more flexible inflatable boots. To remove accumulated paint from the exterior of the paint rack, the boots are internally pressurized causing the expansion of the boots and thereby the cracking and peeling of the accumulated paint.

11 Claims, 3 Drawing Figures

INVENTOR.
FRANK W. HETZNECKER

BY
ATTORNEY.

METHOD AND APPARATUS FOR REMOVING ACCUMULATED PAINT FROM PAINT RACKS

BACKGROUND AND SUMMARY OF THE INVENTION

This invention relates to a method and an apparatus for removing accumulated paint from paint racks used to support articles to be spray painted.

Where large numbers of articles are to be uniformly painted, electro-static spray painting is often utilized. Electro-static spray painting involves the use of special paint racks to support the articles to be painted. Such paint racks may comprise simple tubular frame members from which an article is suspended, or such paint racks may be considerably more complex. In either situation as articles are suspended from otherwise supported by such paint racks and are thereafter electrostatically spray painted, the paint racks invariably accumulate a considerable amount of paint themselves. This paint accumulation causes mechanical interferences when articles are put on and removed from the paint racks, and may also cause interference with the conduction of electricity from a source to the article to be painted.

For these and other reasons, it is desirable to periodically remove all of the paint which has accumulated on the paint racks. Previously such paint accumulations have been removed by chemical means, burning, abrasive blasting, chipping, scraping, or some other such method. All are characterized as being time consuming and often ineffective. The subject invention provides an inexpensive and fast method of removing such accumulated paint from paint rack members. The invention simply comprises enclosing the paint rack member in a substantially air-tight, inflatable boot. This boot fits the frame member in a substantially skin-tight relation. When paint has accumulated on the exterior of this flexible boot, the internal portion of the boot is pressurized causing the boot to expand. This expansion causes the immediate cracking and peeling of the paint accumulated on the exterior of the boot. Whatever portion of the paint does not fall off by itself upon the internal pressurization of the boot may be very easily manually brushed, blown, or scraped away.

Although the principle of removing ice accumulations from aircraft by utilizing an expandable lead is old, the application of this principle to the problem of removing paint from paint racks constitutes a striking advance over the prior art methods of removing such accumulations. The many advantages of the subject invention over the prior art will become apparent upon a reading of the detailed description of the invention in view of the drawing.

DETAILED DESCRIPTION OF THE INVENTION

Figure 1:
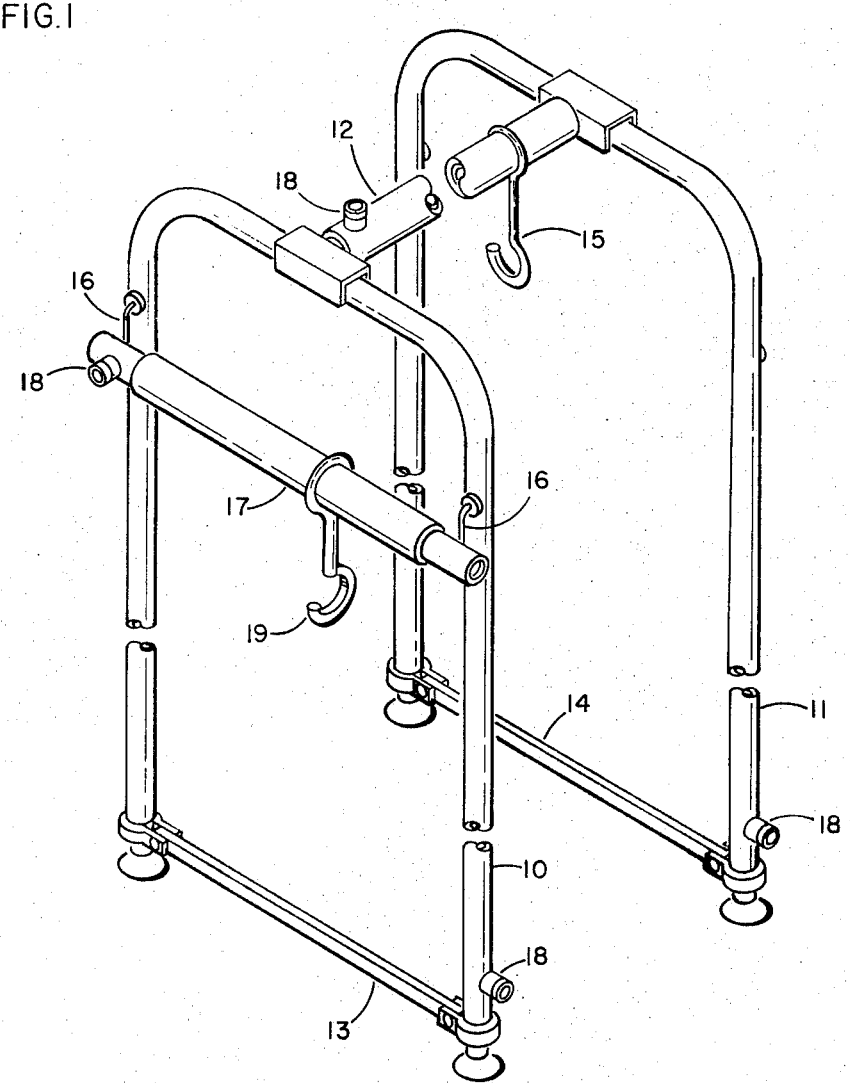
FIG. 1 is a simplified illustration of a paint rack from which an article to be spray painted may be suspended.

FIG. 1 shows a simplified paint rack comprised of tubular frame members or conduits 10, 11, and 12. Attached between the legs of the frame members 10 and 12 are two optional braces 13 and 14 to provide stability to the frame members. Depending from the frame member 12 is a hook or the like 15 from which an article to be painted may be suspended. Attached to member 10 by means of hooks 16 is a lateral member 17 which also may be used to support an article to be painted. A second hook or the like 19 is shown for this purpose.

Each of the members 10, 11, 12, and 17 are comprised of an internal frame member such as metallic conduit, and an exterior flexible, inflatable boot made from some material such as rubber. Each of the members 10, 11, 12, and 17 have inlets 18 to which a source of air pressure may be connected in order to internally pressurize the boots.

Figure 2:
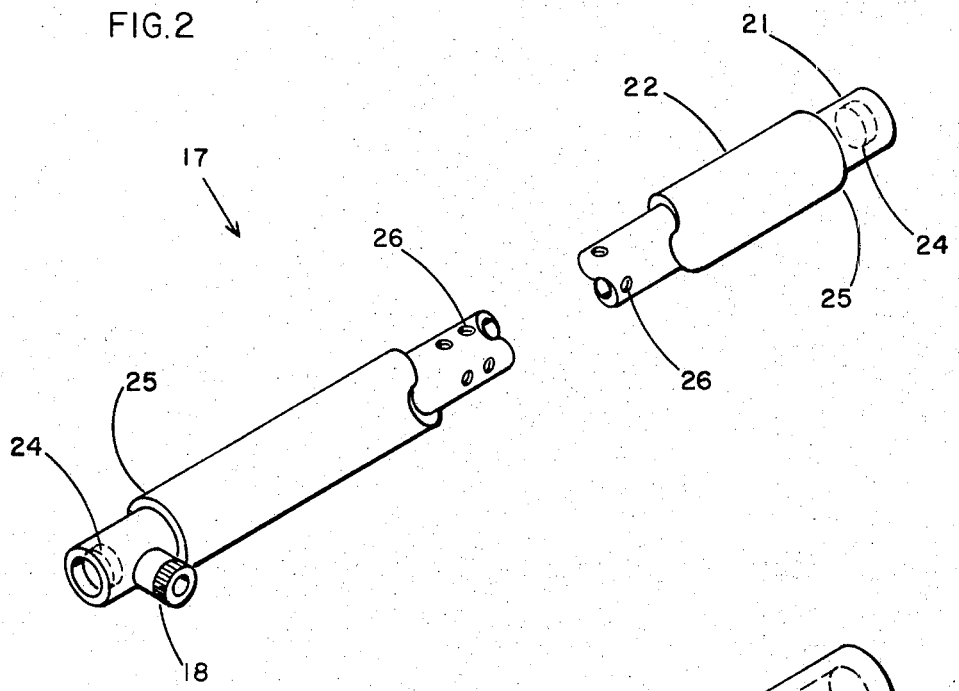
FIG. 2 is an illustration of a frame member enclosed by an inflatable boot.

FIG. 2 shows the member 17 shown in FIG. 1. The member is comprised of a metal conduit 21 and a flexible rubber boot 22 which encloses a substantial portion of the conduit 21 in a substantially skin-tight or at least close-fitting relation. The boot is preferably pre-formed and then stretched to allow the conduit to be inserted. Attached to conduit 21 near its end is the pressure inlet 18 which is in communication with the interior of the conduit 21. At either end or other suitable locations of the conduit 21 are plugs 24 which allow the interior portion of the conduit 21 between the plugs 24 to be pressurized.

Each end of the boot 25 is fixed or adhered to the conduit 21 by means of an adhesive in order that the central portion of the boot 22 may be substantially airtight. Other means such as a mechanical clamp may be used for this purpose. Beneath the central portion of the boot 22 are ports 26 which comprise holes in the conduit 21. When pressure is applied at the inlet 23, it is communicated through the interior of the conduit 21, through the ports 26, and thus beneath the central portion of the boot 22 enclosing the conduit 21. Thereupon the boot is caused to stretch and expand, thereby causing any dried and brittle paint accumulated on the exterior of the boot 22 to crack and loosen or peel off. Any portion of the accumulated paint which does not fall off or peel off may be easily removed by blowing or brushing it off or some other suitable means.

Preferably both ends of the boot 22 are sealed at 25 in order that the boot may be inflated like a balloon. However, the subject method of removing paint is also successful when the air is continuously allowed to escape. All that is necessary is that the boot be caused to expand. A wide range of materials may likewise be used for the boot although such materials should obviously be flexible and would be resistant to the temperature range encountered and to any corrosive effects of the paint which it will accumulate. It is also desirable that the boot material should have a tendency to form only a weak adhesive bond to the paint accumulations. If the boot is to be used on a frame member used in connection with electro-static spray painting, the boot material is preferably electrically conductive. This eliminates the need for special connections to the article to be painted in order to complete the electro-static circuit.

Figure 3:
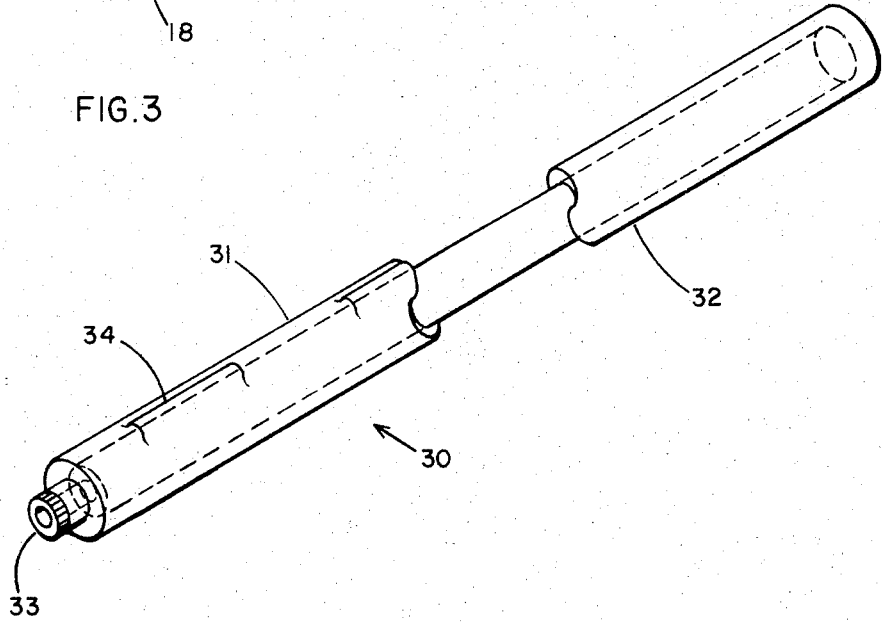
FIG. 3 is an illustration of an alternative embodiment of a frame member enclosed by an inflatable boot.

FIG. 3 is an alternative embodiment of the frame member illustrated in FIG. 2. The frame member 30 of FIG. 3 comprises a tubular conduit 31 made of steel or the like and a rubber boot or the like 32 which completely encloses the conduit 31 in a substantially skin-tight relation. A valve means or inlet 33 is affixed to the exterior portion of the boot 32 and allows the internal portion of the boot 32 between the boot and the conduit 31 to be pressurized. When the boot 32 is pressurized the boot expands and may move radially away from the conduit approximately a quarter of an inch or less which is all that is required to stretch the exterior of the boot to such an extent that the paint accumulated thereon is caused to crack and loosen or peel.

In some instances, where there is a substantial accumulation of paint or where the paint is peculiarly resistive to cracking, it is desirable to provide a thin or weak spot in the accumulated paint from which cracks may propagate. Such a weak spot may be provided by incorporating a flap, bump, or protrusion 34 on the surface of the boot. This protrusion or propagation point means may also take the form of a series of protrusions along the length of the boot. Such a series serves the dual function of assisting in the initiation of cracks and in the holding of articles to be painted in place.

While specific embodiments and examples have been utilized in describing the subject invention, it is intended that the invention be limited only by the scope of the appended claims.

I claim:

1. A method of removing accumulated dried paint from a support member used to support an article to be painted, the support member being substantially enclosed in a skin-tight relation by a flexible boot-like member, the method comprising the step of pressurizing the interior of the boot-like member thereby causing the boot-like member to expand and thereby crack the accumulated paint.

2. A support member for an article to be painted comprising:
   an open frame structure means formed essentially from rod-shaped members, at least one of said rod-shaped members adapted to permit suspension therefrom of the article to be painted;
   flexible boot-like means substantially enclosing at least a portion of said frame structure means in close-fitting relation;
   inlet means associated with the boot-like means adapted to allow the internal pressurization of the boot-like means, the pressurization causing the expansion of the boot-like means and thereby the cracking and peeling of the paint accumulated on the exterior of the boot-like means during the painting of the article.

3. The invention according to claim 2 wherein the boot-like member is substantially air-tight.

4. The invention according to claim 2 further comprising propagation point means associated with the boot-like means.

5. The invention according to claim 2 wherein said flexible, suitable, boot-like means comprises an inflatable boot.

6. A support member for an article to be electrostatically spray painted comprising:
   an open frame structure means formed essentially from conduit means, at least one of said conduit means adapted to permit suspension therefrom of the article to be painted;
   an inflatable boot means substantially enclosing at least a portion of said conduit means in a substantially skin-tight relation;
   inlet means associated with the boot means adapted to allow the internal pressurization of the boot means, the pressurization causing the expansion of the boot means and thereby cracking and peeling of paint accumulated on the exterior of the boot means during the painting of the article.

7. The invention according to claim 6 wherein the boot means is substantially air-tight.

8. The invention according to claim 6 wherein the boot means comprises an electrically conductive material.

9. The invention according to claim 6 further comprising propagation point means associated with the boot means.

10. The invention according to claim 6 wherein the boot means material is such that only a weak adhesive bond is formed with the paint accumulation.

11. The invention according to claim 6 wherein said inflatable boot means comprises an inflatable boot.

* * * * *